United States Patent [19]
Yishay et al.

[11] Patent Number: 5,623,687
[45] Date of Patent: Apr. 22, 1997

[54] RESET CONFIGURATION IN A DATA PROCESSING SYSTEM AND METHOD THEREFOR

[75] Inventors: Oded Yishay; Joseph Jelemensky; Jeffrey D. Quinn; Daniel W. Pechonis, all of Austin, Tex.

[73] Assignee: Motorola, Schaumburg, Ill.

[21] Appl. No.: 494,664

[22] Filed: Jun. 26, 1995

[51] Int. Cl.⁶ .................................................. G06F 13/00
[52] U.S. Cl. .................. 395/800; 364/232.9; 364/240.5; 364/264.1; 364/DIG. 1
[58] Field of Search .................................... 395/830, 834, 395/838, 309, 500, 182.03, 182.08, 182.21, 183.16, 734, 735, 775, 800; 370/85.1, 85.9, 85.13; 340/825.06; 371/11.3, 16.2

[56] References Cited

U.S. PATENT DOCUMENTS

| | | | |
|---|---|---|---|
| 4,272,829 | 6/1981 | Schmidt et al. | 395/800 |
| 4,697,140 | 9/1987 | Saito et al. | 324/73.1 |
| 5,438,672 | 8/1995 | Dey | 395/500 |
| 5,448,744 | 9/1995 | Eifert et al. | 395/800 |
| 5,483,660 | 1/1996 | Yishay et al. | 395/280 |
| 5,513,334 | 4/1996 | Alexander | 395/430 |
| 5,517,646 | 5/1996 | Piccirillo et al. | 395/700 |
| 5,522,086 | 5/1996 | Burton et al. | 395/829 |
| 5,555,432 | 9/1996 | Grochowski et al. | 395/775 |

*Primary Examiner*—Alpesh M. Shah

[57] ABSTRACT

Data processor (10) configures internal circuitry during execution of a reset operation in response a logic state of a Mode Select signal. If an external bus control (44) determines the Mode Select signal is in a first logic state, configuration data is provided from a mask register (40). The data is transferred to a plurality of configuration registers (50) and, subsequently, to a remaining portion of data processor (10). If the Mode Select signal is in a second logic state, configuration data is provided from a plurality of bus terminals (48). The data is transferred to the plurality of configuration registers (50). The contents of the plurality of configuration registers (50) are transferred to bus interface unit (42) which subsequently transfers the data to a remaining portion of data processor (10).

9 Claims, 5 Drawing Sheets

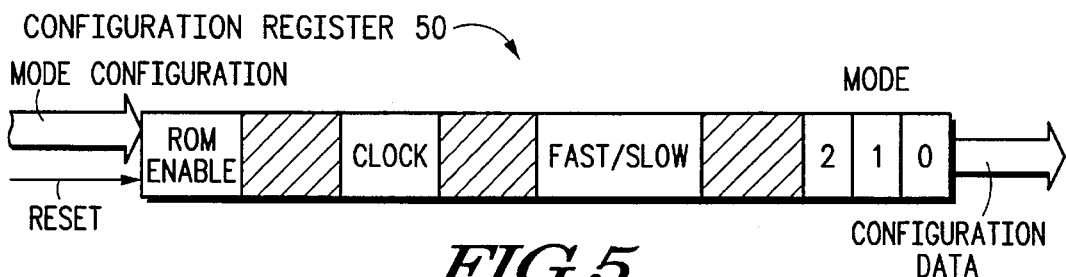

FIG. 5

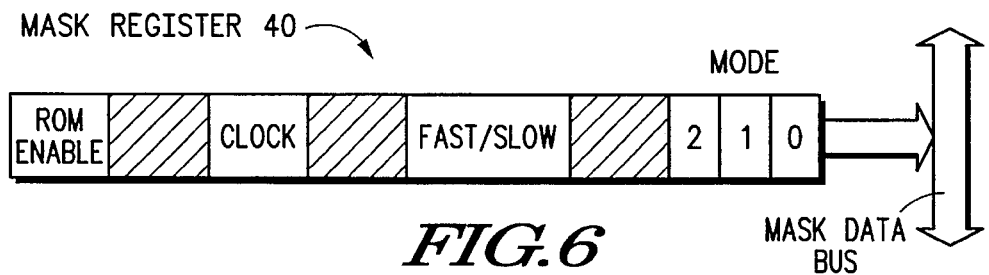

FIG. 6

| REGISTER FIELD AFFECTED | OVERRIDE PINS | EFFECT* | | | |
|---|---|---|---|---|---|
| MODE | SIZE, R/W̄, DATA STROBE (DS) | DS | SIZE | R/W̄ | MODE SELECT |
| | | 0 | 0 | 0 | 16 BIT PERIPHERAL |
| | | 0 | 1 | 0 | SLAVE FACTORY TEST MODE |
| | | 0 | 1 | 1 | MASTER TEST MODE |
| | | 1 | 0 | 0 | MULTIPLEXED MASTER MODE |
| | | 1 | 0 | 1 | NON MULTIPLEXED MASTER MODE |
| | | 1 | 1 | X | SINGLE CHIP MODE |
| FAST/SLOW | IRQX | 0 | | | FAST REFERENCE SIGNAL |
| | | 1 | | | SLOW REFERENCE SIGNAL |
| ROM ENABLE | AD[11] | 0 | | | BOOT ROM ENABLE |
| | | 1 | | | BOOT ROM DISABLE |
| CLOCK | AD[0] | 0 | | | PORT D[4] |
| | | 1 | | | CLOCK OUT |

\* IF MODE SELECT IS SECOND LOGIC STATE, MODE VALUES ARE TAKEN FROM THE EXTERNAL TERMINALS.
IF MODE SELECT IS FIRST LOGIC STATE, MODE VALUES ARE TAKEN FROM THE MASK REGISTER.

FIG. 7

RESET CONFIGURATION IN A DATA PROCESSING SYSTEM AND METHOD THEREFOR

CROSS REFERENCE TO RELATED APPLICATION

This application is related to our commonly assigned copending patent application Ser. No. 08/494,461, filed Jun. 26, 1995 and entitled "Flexible Pin Configuration for Use in a Data Procesing System During a Reset Operation and Method Therefor" by Wallace Harwood, Attorney Docket No. SC-02417A.

FIELD OF THE INVENTION

The present invention relates to a data processor having a mask programmed register, in general, and more particularly, to a data processor having a mask programmed register for determining a reset configuration of the data processor.

BACKGROUND OF THE INVENTION

When a data processor is reset, the data processor is configured in a preselected reset configuration which depends on an application being performed by the data processor. Some data processors are configured for reset using a system integration module. Other data processors which have multiple modes of operation require multiple external integrated circuit pins to determine a reset configuration for a particular application. When a data processor is configured for reset in accordance with logic values driven to external integrated circuit pins, external circuitry is required to drive the logic values onto the integrated circuit pins. Furthermore, the logic values, or configuration data, must be removed from the integrated circuit pins after a reset operation is executed to allow for a normal mode of operation.

Additionally, a configuration for operation of the device after execution of the reset operation should be established during the reset operation since a data processing operation immediately following the reset operation may provide different results in different data processor configurations. For example, a data processing instruction may be required to "tell" the data processor whether the first instruction after reset should be fetched from internal storage within the data processor or from a device external to the data processor. In another example, the instruction may be required to "tell" the data processor whether a mode of operation is a multiplexed mode, where address signals, data signals, and optional control signals are provided on the same bus terminals at different times, or a non-multiplexed mode, where address signals, data signals, and control signals are provided on different bus terminals. When no configuration is specified during a reset operation, the data processor is typically placed in a default configuration.

An external user who desires to override the default configuration of a data processor generally uses an external circuit to drive appropriate reset configuration data onto the external integrated circuit pins of the data processor to configure the data processor in a desired manner. However, providing the external circuit significantly increases overhead costs associated with the data processor and may be prohibitive in some data processing environments. A new solution is required to provide for external reset configuration of a data processor in a cost effective manner. This statement is especially true for those users who require a high volume of data processors because they may be significantly more competitive if they are able to eliminate the external circuit now required to drive reset configuration data onto external integrated circuit pins during a reset operation.

Such users have generally met their volume needs by requiring a manufacturer of the data processor to develop and manufacture a data processor that is tailored to their specifications. This tailored solution also requires the manufacturer to provide a circuit for selectively configuring the data processor to another configuration, even the default configuration, for any number of purposes which may be required for low volume users who cannot afford to require the manufacturer to tailor a data processor tailored to their specifications. As a compromise, the manufacturer may implement a register in an electrically erasable programmable read only memory, (EEPROM) which may be programmed to configure the data processor to operate in a certain mode of operation. However, this EEPROM register is generally hard to test, requires a long time to program, and is more expensive to implement. Furthermore, programming the EEPROM register is another manufacturing step which may significantly increase the overhead costs associated with high volume users.

Therefore, there is a need for a data processor which may be easily configured during reset and which minimizes overhead costs of the data processor.

SUMMARY OF THE INVENTION

The previously mentioned needs are fulfilled with the present invention. Accordingly, there is provided, in a first form, a data processing system. The data processing system includes a bus interface unit for receiving a plurality of internal address values, a plurality of internal data values, and a plurality of internal control values and a mask register for storing a first configuration data value. The data processing system also includes a plurality of bus terminals. A first portion of the plurality of bus terminals receives a second configuration data value and a second portion of the plurality of bus terminals receives a mode select data value. A reset circuit provides an internal reset signal to indicate the data processing system is executing a reset operation. An external bus control circuit is connected to the reset circuit to receive the internal reset signal. Furthermore, the external bus control circuit is connected to the plurality of bus terminals to receive the second configuration data value and the mode select data value. The external bus control circuit is also connected to the mask register to receive the first configuration data value. The external bus control circuit provides the first configuration data value when the mode select data value is in a first logic state and the external bus control circuit provides the second configuration data value when the mode select data value is in a second logic state. A configuration register is connected to the reset circuit to receive the internal reset signal and is connected to the external bus control circuit to store a one of the first configuration data value and the second configuration data value when the internal reset signal is asserted.

In a second form, the present invention provides a method for configuring a data processor. The method includes the steps of enabling a reset circuit to assert a reset signal, retrieving a mode control signal from a configuration register, and retrieving a mask configuration data value from a mask register when the mode control signal is in a first logic state. The mask configuration data value is stored in a configuration register when the mode control signal is in the first logic state. An external configuration data value is retrieved from a plurality of integrated circuit terminals when the mode control signal is in a second logic state. The external configuration data value is then stored in the configuration register when the mode control signal is in the second logic state.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

FIG. 5 illustrates a configuration register of FIG. 2;

FIG. 6 illustrates a mask register of FIG. 2;

FIG. 7 illustrates in tabular form a relationship between a field in the configuration register or the mask register and an effect on the data processing system of FIG. 1.

DETAILED DESCRIPTION OF A PREFERRED EMBODIMENT

Figure 1:
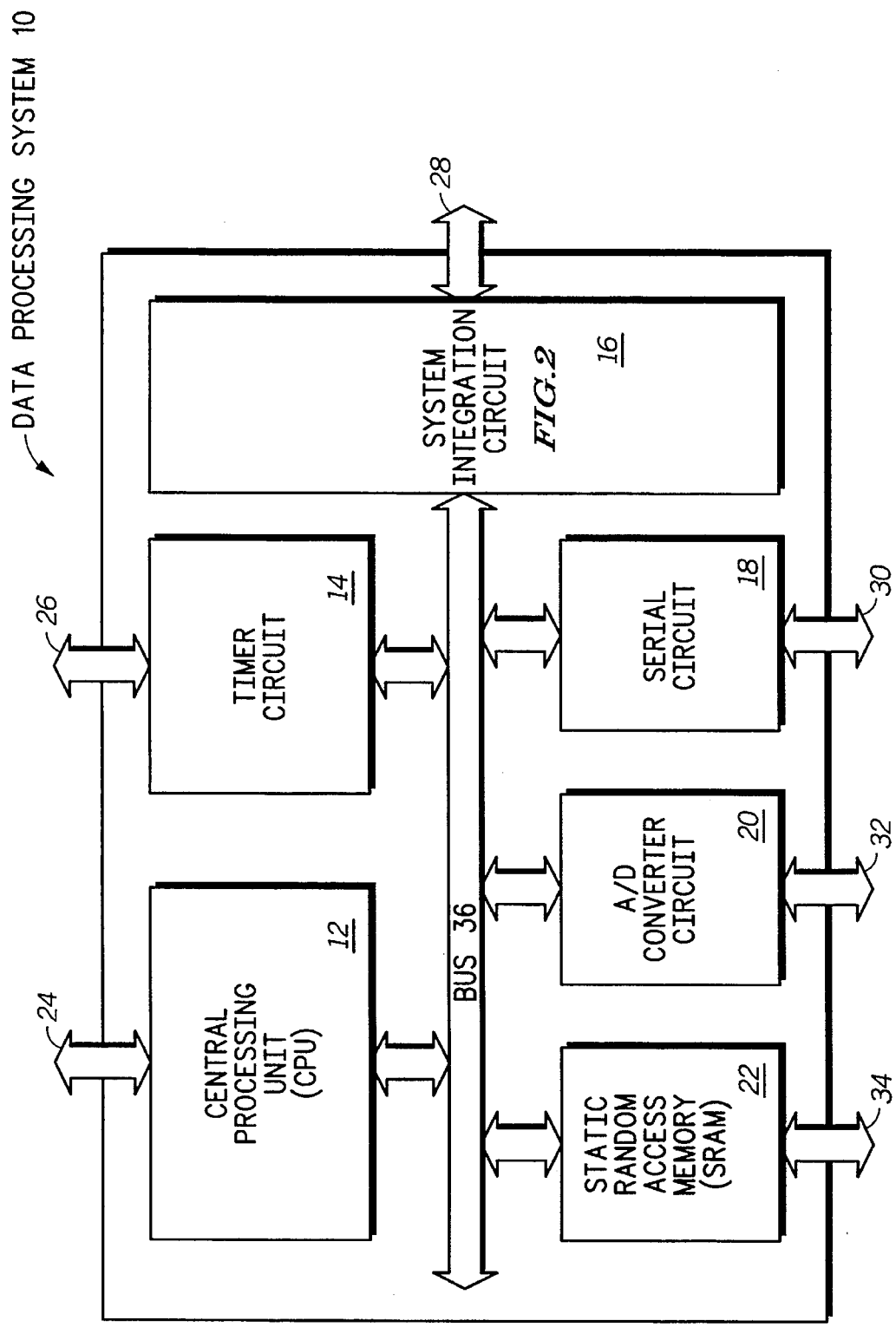
FIG. 1 illustrates in block diagram form a data processing system for implementing the present invention.

The present invention provides an internal mask programmable register which determines a default configuration of a data processor during a reset operation. This default configuration includes an external bus configuration, a clock configuration, a chip select configuration, and a port configuration. The mask programmable register is inexpensive to implement in read only memory (ROM) and fulfills a user's high volume manufacturing needs without increasing the cost or size of a user's system. Additionally, the mask programmable register in ROM does not require an extra programming step as is required by prior art implementations which use a EEPROM. Furthermore, a user may override the default configuration and configure the data processor in another manner by driving data for establishing the configuration of the data processor on external integrated circuit pins. Therefore, user's having low volume needs may override the default configuration to configure the data processor for their specific applications.

A general description of the environment in which the present invention is implemented will now be discussed. During a reset operation, a configuration of the data processor would be determined because a first operation after reset may enable the data processor to function differently in different configurations. In the present invention, a default reset configuration of a data processor is taken from the programmable mask register unless the default reset configuration is overridden. The default reset configuration includes information for controlling an external bus configuration, a dock configuration, a chip select configuration, and a port configuration.

A customer which uses the data processor specifies the values to be programmed into the mask register during the fabrication process of the data processor. Optionally, the default reset configuration may be driven from external integrated circuit pins for applications such as production testing, development systems, prototypes, and for users who purchase data processors which may not have the required default reset configuration for their application. A single integrated circuit pin is used to select whether data is taken from a plurality of external integrated circuit pins or from the internal mask register. When the single integrated circuit pin is in a first logic state, a configuration data value used to configure the data processor is determined by the contents of the mask register. When the single integrated circuit pin is in a second logic state, the configuration data value is taken from the plurality of external integrated circuit pins.

The combined use of the mask programmable register and the ability to override a default configuration determined by the mask programmable register makes the present invention more cost effective than prior art implementations. For example, high volume users may eliminate external circuitry required to drive configuration data during execution of a reset operation and, therefore, reduce the cost of their data processing systems. Furthermore, the mask programmable register may be implemented by the manufacturer of the processor using known technology such that the data processor may be tailored to the specifications of such high volume users. Furthermore, the user may easily configure the data processor using the internal mask register by either placing a mode select terminal in a first logic state. If configuration data is not driven onto the external integrated circuit pins of the data processor by an external device, the mode select terminal is set to the first logic state by circuitry internal to the data processor. Stated another way, none of the external integrated circuit pins, except for a reset integrated circuit pin, must be driven by an external device during reset to set the configuration data from the internal mask registers. Such a feature is very useful for users who want to avoid the overhead costs of providing an external device to provide the reset configuration data to the external integrated circuit pins during a reset operation.

The present invention also allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

Note that during a following description of connectivity and operation of a data processor implementing the present invention, the term "during reset" refers to a period that a Reset signal is asserted. The term "normal operation" refers to a mode of operation of the data processor when the Reset signal is negated.

DESCRIPTION OF CONNECTIVITY

FIG. 1 illustrates a data processing system 10. Data processing system 10 communicates with external devices via a bus 28, a plurality of integrated circuit terminals 24, a plurality of integrated circuit terminals 26, a plurality of integrated circuit terminals 30, a plurality of integrated circuit terminals 32, and a plurality of integrated circuit terminals 34. Bus 28 may be used interchangeably with a plurality of integrated circuit terminals 28 in the present document. Data processing system 10 includes a central processing unit (CPU) 12, a timer circuit 14, a system integration circuit 16, a serial communications circuit 18, an analog to digital (A/D) converter 20, and a static random access memory (SRAM) 22. Each CPU 12, timer circuit 14, system integration circuit 16, serial communications circuit 18, A/D converter 20, and SRAM 22 communicate internally via a bus 36.

Figure 2:
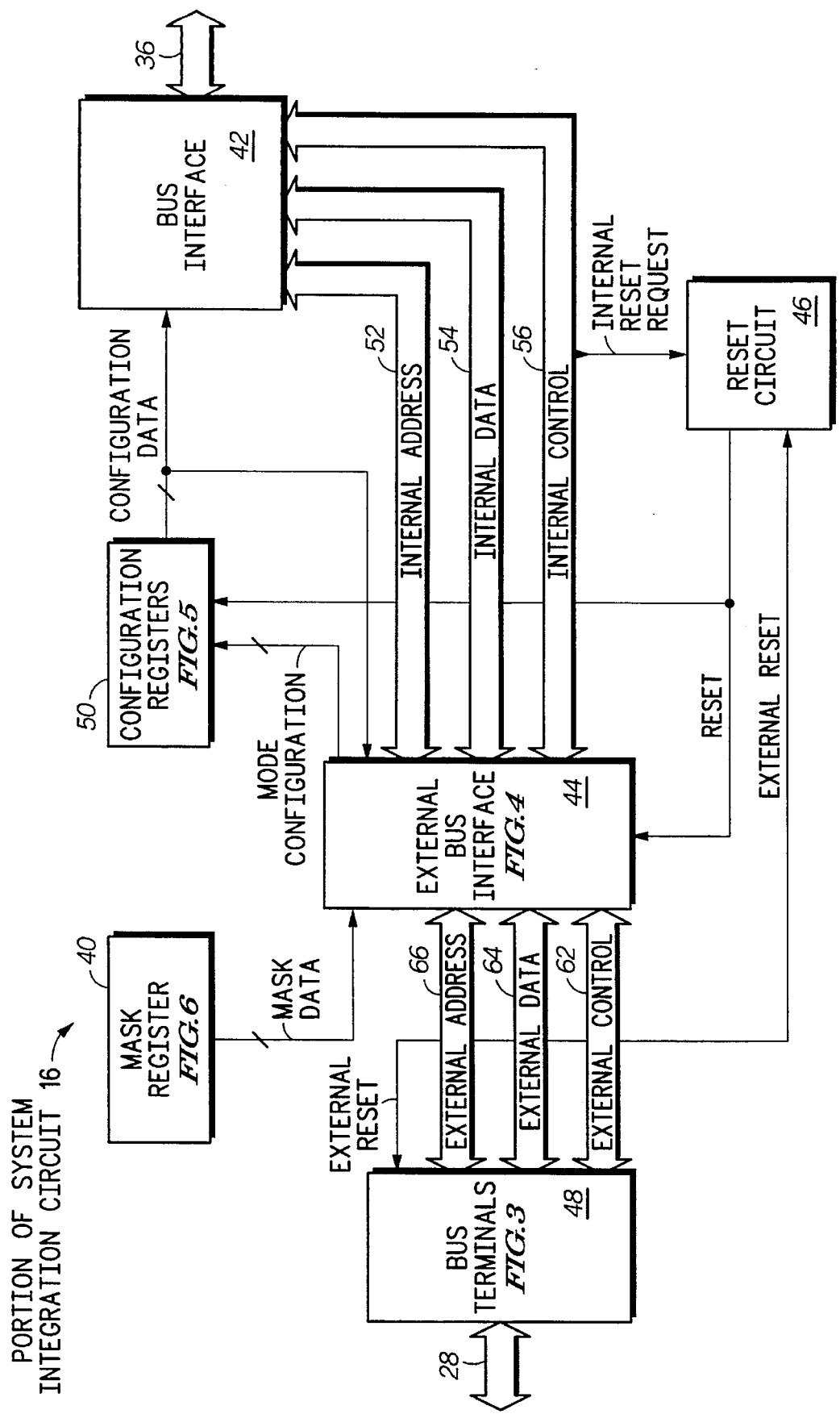
FIG. 2 illustrates in block diagram form a portion of a system integration circuit of the data processing system of FIG. 1.

FIG. 2 illustrates a portion of system integration circuit 16 of data processing system 10 utilizing the present invention. System integration circuit 16 includes a mask register 40, a bus interface unit 42, an external bus control 44, a reset circuit 46, a plurality of bus terminals 48, and a plurality of configuration registers 50. Bus interface unit 42 of system integration circuit 16 is coupled to a remaining portion of data processing system 10 via bus 36. Bus interface unit 42 is coupled to external bus control 44 via an Internal Address bus 52, an Internal Data bus 54, and an Internal Control bus 56. External bus control 44 is bidirectionally coupled to the plurality of bus terminals 44 via an External Address bus 66, an External Data bus 64, and an External Control bus 62. The plurality of bus terminals 48 are coupled to an external device via bus 28. Bus interface unit 42 is also coupled to reset circuit 46 to communicate an Internal Reset Request signal via Internal Control bus 56. Reset circuit 46 provides a Reset signal to both external bus control 44 and the plurality of configuration registers 50. The plurality of bus terminals 48 is coupled to reset circuit 46 to communicate an External Reset signal. The plurality of configuration registers 50 provides a multi-bit Configuration Data signal to both bus interface unit 42 and external bus control 44. External bus control 44 is coupled to the plurality of configuration registers 50 to receive a multi-bit Mode Control signal. Mask register 40 is coupled to external bus control 44 to provide a multi-bit Mask Data signal.

Figure 3:
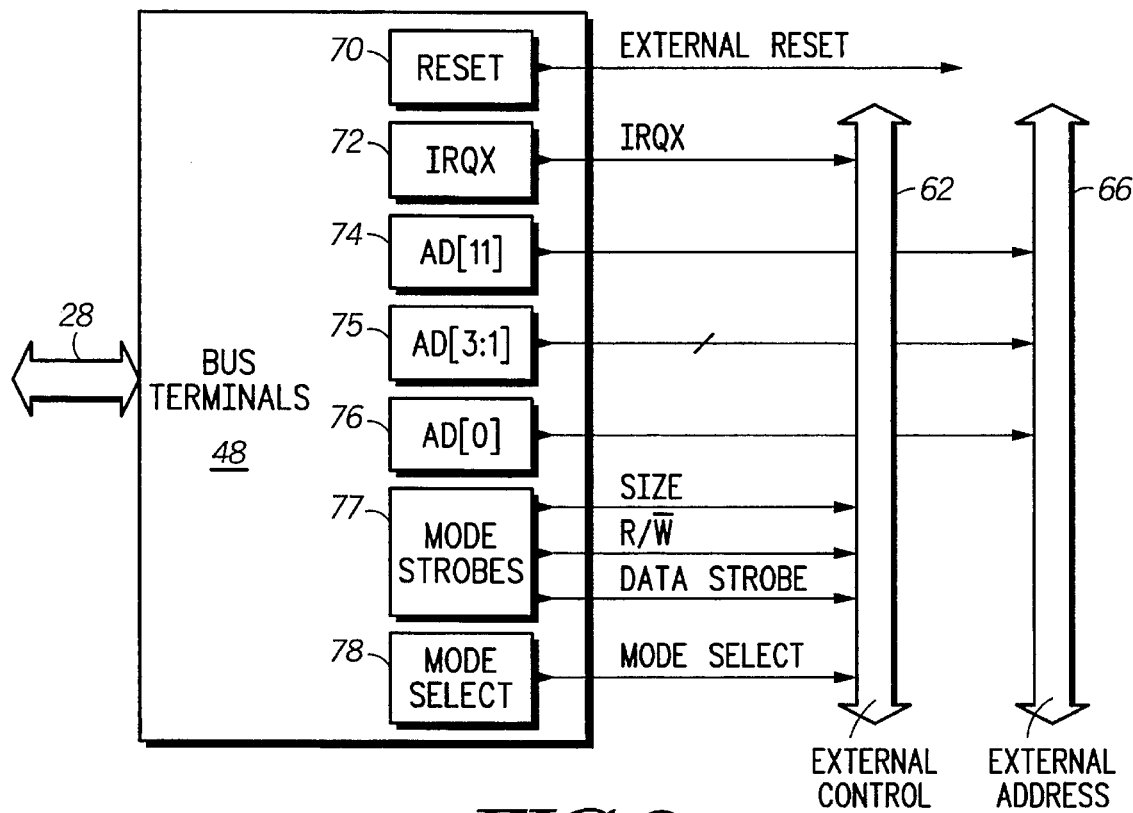
FIG. 3 illustrates in block diagram form a plurality of bus terminals of the system integration circuit of FIG. 2.

FIG. 3 illustrates a portion of the plurality of bus terminals 48. The plurality of bus terminals 48 include a reset terminal 70, an IRQX (Interrupt Request X) terminal 72, an AD[11] terminal 74, a plurality of AD[3:1] terminals 75, an AD[0] terminal 76, a plurality of mode strobes 77, and a mode select terminal 78. Reset terminal 70 provides an External Reset signal. IRQX terminal 72 provides an IRQX signal to External Control bus 62. AD[11] terminal 76, the plurality of AD[3:0] terminals 75, and AD[0] terminal 76 provide a plurality of address bits to an External Address bus 66. Mode strobes terminal 77 provides a Size signal, a R/$\overline{W}$ (Read/ Write) signal, and a Data Strobe signal to External Control bus 62. Mode select terminal 78 provides a Mode Select signal to External Control bus 62. The plurality of bus terminals 48 are also coupled to an external device via Bus 28.

Figure 4:
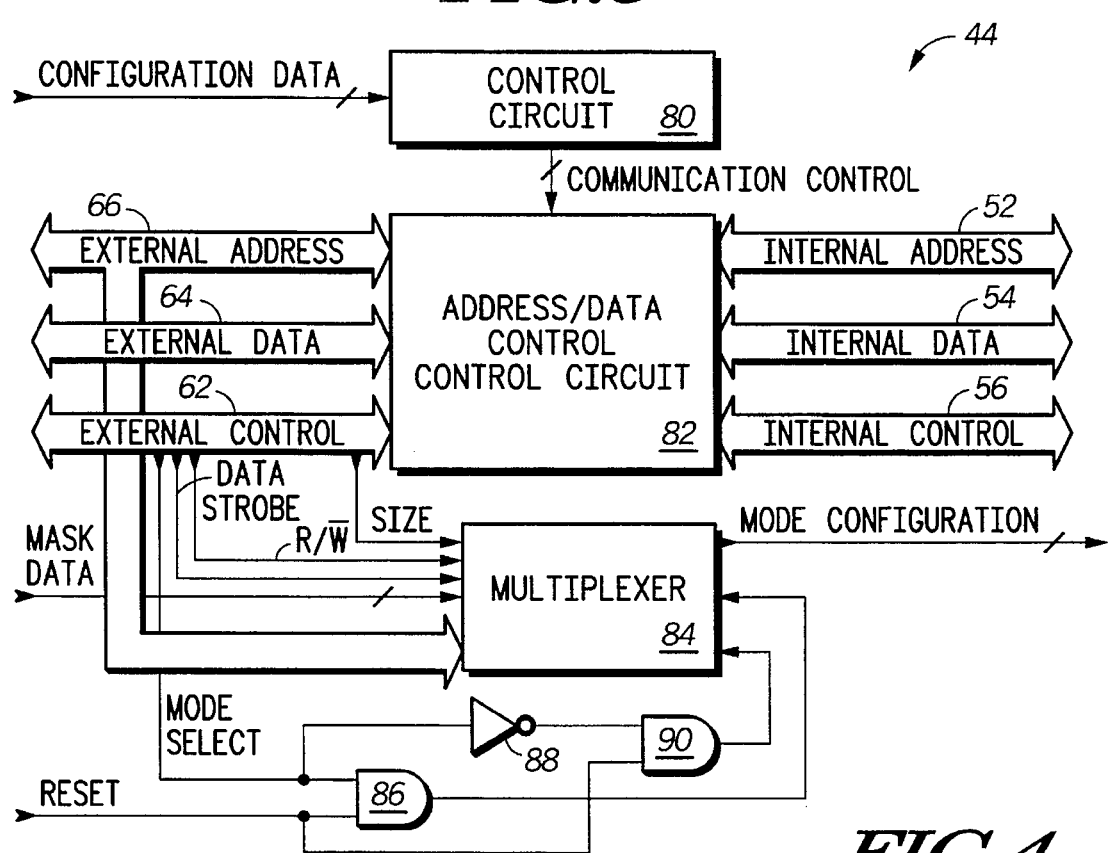
FIG. 4 illustrates in block diagram form an external bus interface of the system integration circuit of FIG. 2.

FIG. 4 illustrates a portion of external bus control 44 in more detail. External bus control 44 includes a control circuit 80, and address/data control circuit 82, a multiplexer 84, an AND gate 86, an inverter 88, and an AND gate 90. Control circuit 80 receives the Configuration Data signal and provides a Communication Control signal to address/data control circuit 82. Address/data control circuit 82 also receives information via Internal Address bus 52, Internal Data bus 54, and Internal Control bus 56, External Address bus 66, External Data bus 64, and External Control bus 62. External Control bus 62 is coupled to multiplexer 84 to communicate the Size, R/$\overline{W}$, and Data Strobe signals to multiplexer 84. The Mask Data signal is also provided to multiplexer 84. Multiplexer 84 is also coupled to External Address bus 66. Multiplexer 84 provides the Mode Configuration signal. The Reset signal is provided to a first input of AND gate 86 and a first input of AND gate 90. The Mode Select signal is provided to a second input of AND gate 86 and an input of inverter 88. An output of inverter 88 is coupled to a second input of AND gate 90. An output of AND gate 90 is coupled to multiplexer 84. Similarly, an output of AND gate 86 is coupled to multiplexer 84.

During a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state. It should also be noted that a "$" preceding a value indicates that the value is hexadecimal.

DESCRIPTION OF OPERATION

During operation of data processing system 10 illustrated in FIG. 1, CPU 12 controls operation of each of timer circuit 14, system integration circuit 16, serial circuit 18, A/D converter circuit 20, and SRAM 22 via a plurality address, data, and control signals transferred via Bus 36. CPU 12 executes each of the instructions required during operation of data processing system 10. Bus 36 communicates information between CPU 12 and a remaining portion of data processing system 10. Furthermore, timer 14 provides timing control and interrupt features between data processing system 10 and an external device via the plurality of integrated circuit pins 28. The timing control and interrupt features are generally well known in the data processing art and will not be discussed in further detail. Serial circuit 18 communicates serial data between data processing system 10 and an external device via the plurality of integrated circuit pins 30. A/D converter 20 executes analog to digital conversion operations in response to data provided by an external source via the plurality of external integrated circuit pins 32. SRAM 22 provides memory storage for functions executed during operation of data processing system 10. Additionally, system integration circuit 16 allows interaction between data processing system 10 and a plurality of other external devices.

A portion of system integration circuit 16, illustrated in more detail in FIG. 2, determines whether data processing system 10 should be configured according to a reset default configuration stored in a mask register or according to external data provided to the plurality of bus terminals 48 via Bus 28. During operation of data processing system 10, a reset operation may be generated either internal or external to system integration circuit 16. Externally generated reset operation begins when an external device asserts reset integrated circuit terminal 70 (of FIG. 2) of the plurality of bus terminals 48. Reset integrated circuit terminal 70 provides the External Reset signal in response thereto. Subsequently, the External Reset signal is transferred to reset circuit 46 and reset circuit 46 asserts the Internal RESET signal. Likewise, a internally generated reset operation may be generated by any module of data processing system 10. Such an internal reset request may be provided to bus interface unit 42 via Bus 36. The internal reset request is then sent to reset circuit 46 via the Internal Reset Request signal. Alternately, the internal reset request may be generated directly by a requesting module or submodule of data processing system 10. In response to receipt of the Internal Reset Request signal, reset circuit 46 asserts both the Reset signal and the External reset signal. Where both external and internal reset operations are initiated, the Internal Reset signal, the External Reset signal, and reset integrated circuit terminal 70 are asserted.

Typically, during normal operation of data processing system 10, the Reset signal is not asserted. External bus interface 44 receives the Configuration Data signal, and communicates address, data, and control information between Internal Address bus 52, Internal Data bus 54, Internal Control Bus 56, External address 66, External Data bus 64, and External Control bus 62. External Bus Interface 44 may also receive other control and timing signals (not shown herein). Bus Interface unit 42 also receives the Configuration Data signal and is coupled to Internal Control bus 56, Internal Data bus 54 and Internal Address bus 52 to communicate address, data, and control information between the portion of system integration circuit 16 of FIG. 2 and an external device.

When external reset integrated circuit pin 70 is asserted, data processing system 10 is configured for a desired mode of operation. These modes may include a peripheral mode, a slave factory test mode, a master test mode, a multiplexed master mode, a non-multiplexed master mode, and a single chip mode. Mode select integrated circuit terminal 78 provides the Mode Select signal to select whether data necessary for configuring data processing system 10 is provided internally from the mask register 40 or externally via the plurality of bus terminals 48. If the Mode Select signal provided by mode select integrated circuit terminal 78 is in a first logic state during a reset operation, configuration data is retrieved from mask register 40 and transferred to external bus control 44 via the Mask Data signal. External bus control 44 then transfers the Mask Data signal to the plurality of configuration registers 50 via the Mode Configuration signal. After being latched in the plurality of configuration registers 50, the Mode Configuration signal is transferred to bus interface unit 42 and to external bus interface 44 via the Configuration Data signal. Bus interface unit 42 transfers the configuration data to a remaining portion of data processing system 10 via Bus 36.

If the Mode Select signal provided by mode select integrated circuit terminal 78 is in a second logic state, configuration data is retrieved by the plurality of bus terminals 48. An external device (not illustrated herein) provides the configuration data to the plurality of bus terminals 48 via external Bus 28 when Reset integrated circuit terminal 70 is asserted. The configuration data is transferred to external bus control 44 via External Address bus 66, External Data bus 64, and External Control bus 62. External bus control 44 transfers the configuration data received from the plurality of bus terminals 48 to the plurality of configuration registers 50 via the multi-bit Mode Configuration signal. The configuration data transferred via the Mode Configuration signal is latched in the plurality of configuration registers 50. From the plurality of configuration registers 50, the configuration data is transferred to the bus interface unit 42 and external bus control 44 via the Configuration Data signal. Bus interface unit 42 transfers the configuration data to a remaining portion of data processing system 10 via Bus 36. As previously mentioned before, a single external pin, Mode Select integrated circuit terminal 78, is used to determine and select if the configuration data is taken from internal mask register 40 or from the plurality of external integrated circuit terminals 48.

Typically, Mode Select integrated circuit terminal 78 is set to a logic state by an external device (not shown herein). If a user wants to configure data processing system 10 from internal mask register 40, the user should either set Mode Select integrated circuit terminal 78 to a first logic state or passively allow Mode Select integrated circuit terminal 78 to be set to the first logic state by not actively setting terminal 78. If not driven by an external device, Mode Select integrated circuit terminal 78 is set internally to the first logic state. Stated another way, none of the external plurality of integrated circuit pins 48, except for Reset integrated circuit terminal 70, should be driven by the external device during a reset operation in order to access the configuration data stored in internal mask register 40. The contents of mask register 40 are stored during a fabrication phase of the manufacturing process of data processing system 10. Because a user of data processing system 10 is not required to provide the external device to set the reset configuration data to the plurality of bus terminals 48 during the reset operation, both hardware overhead costs and time are saved.

Alternatively, if the user wants to configure data processing system 10 using data provided by external Bus 28 via the plurality of bus terminals 48, the user should set Mode Select integrated circuit terminal 78 to a second logic state and set a remaining portion of integrated circuit terminals 48 to a preselected state during a reset operation. Such an alternative method for configuring data processing system 10 allows the user to have flexibility in establishing any desired reset configuration during reset. Furthermore, during use of this second configuration technique, bus interface unit 42 and external bus control 44 are configured to a desired configuration as determined by configuration data received via the Mode Configuration signal during the reset operation. Likewise, other modules included in data processing system 10 are configured during reset to a desired configuration via configuration data provided via Bus 36.

The plurality of bus terminals 48 is illustrated in more detail in FIG. 3. Please note that the configuration illustrated in FIG. 3 is provided for example only and other configurations may be similarly implemented. During a reset operation, the plurality of integrated circuit terminals 48 have alternate functions. For example, IRQX integrated circuit terminal 72 is generally used to transfer an interrupt request from an external device to data processing system 10 or from data processing system 10 to the external device. During the reset operation, IRQX integrated circuit terminal 72 may be used to select a clock frequency option for operation of data processing system 10. If Mode Select integrated circuit terminal 78 is in a second logic state, a clock reference (not illustrated herein) is configured in response to a logic state of IRQX integrated circuit terminal 72. If IRQX integrated circuit terminal 72 is in a first logic state, the clock input to processing system 10 is in a fast reference mode. When the clock input indicates the fast reference mode, a clock synthesis circuit (not illustrated herein) of data processing system 10 indicates that an external source will provide a clock signal having a fast frequency. If IRQX integrated circuit terminal 72 is in a second logic state, the clock input to processing system 10 is in a slow reference mode. When the clock input indicates the slow reference mode, a clock synthesis circuit (not illustrated herein) of data processing system 10 indicates that an external source will provide a clock signal having a slow frequency. As previously mentioned, an external device provides the configuration data to IRQX integrated circuit terminal 72 via external Bus 28 when Reset integrated circuit terminal 70 is asserted and Mode Select integrated circuit terminal 78 is in a second logic state. The configuration data is subsequently transferred from IRQX integrated circuit terminal 62 to External Control bus 62.

Like IRQX integrated circuit terminal 72, AD[11] integrated circuit terminal 74, the plurality of AD[3:1] terminals 75 and AD[0] integrated circuit terminal 76 execute alternative functions during a reset operation. AD[11] integrated circuit terminal 74, the plurality of AD[3:1] terminals 75 and AD[0] integrated circuit terminal 76 are generally used to transfer a respective portion of an address of a bus cycle from data processing system 10 to an external device or from the external device to data processing system 10. During a reset operation, AD[11] integrated circuit terminal 74 may be used to select a device which provides data processing system 10 a first instruction after the reset operation is completed. If Mode Select integrated circuit terminal 78 is in a second logic state, data processing system 10 is configured by a state of AD[11] integrated circuit terminal 74. If AD[11] integrated circuit terminal 74 is in a first logic state, an internal boot ROM (Read Only Memory) (not illustrated herein) provides data processing system 10 with the first instruction after the reset operation is completed. If AD[11] integrated circuit terminal 74 is in a second logic state, the internal boot ROM on data processing system 10 is disabled and an external device provides data processing system 10 with the first instruction after the reset operation is completed.

Furthermore, during a reset operation, AD[0] integrated circuit terminal 76 may select a function of a clock output/port integrated circuit terminal (not illustrated herein). If Mode Select integrated circuit terminal 78 is in a second logic state, a device which provides the clock output/port data function to data processing system 10 is configured by a logic state of AD[0] integrated circuit terminal 76. If AD[0] integrated circuit terminal 76 is in a first logic state, clock output/port integrated circuit terminal executes a port function. If AD[0]integrated circuit terminal 76 is in a second logic state, the clock output/port integrated circuit terminal executes a clock function. The external device provides the configuration data to IRQX terminal 72, AD[11] integrated circuit terminal 74, the plurality of AD[3:1] terminals 75 and AD[0] integrated circuit terminal 76 via external Bus 28 when Reset integrated circuit terminal 70 is asserted and Mode Select integrated circuit terminal 78 is in a second logic state. The configuration data is subsequently transferred to External Address bus 66 and transferred to a remaining portion of system integration circuit 16.

The plurality of Mode Strobe integrated circuit terminals 77 also have alternative functions depending on a mode of operation of data processing system 10. The plurality of Mode Strobe integrated circuit terminals 77 generally provide bus transfer timing. Additionally, the plurality of Mode Strobe signals also communicate other bus transfer attributes, such as a size of a bus transfer and whether the bus transfer is a read or a write operation. During a reset operation, the plurality of mode strobe integrated circuit terminals 77 may be used to select a mode of operation of data processing system 10. If Mode Select integrated circuit terminal 78 is in a second logic state, a mode of operation of data processing system 10 is dependent on the logic states of each of the plurality of mode strobe integrated circuit terminals 77.

For example, if the plurality of mode strobe integrated circuit terminals 77 is in a first logic state, data processing system 10 is configured to operate in a peripheral mode. In peripheral mode, CPU 12 is disabled from accessing Bus 36. An external device may access system integration unit 16 via Bus 28. Furthermore, the external device may access timer circuit 14, serial circuit 18, A/D converter 20, and SRAM 22 via bus 28, system integration unit 16, and Bus 36. If the plurality of mode strobe integrated circuit terminals 77 is in a second logic state, data processing system 10 is configured to operate in a slave factory test mode. In slave factory test mode, CPU 12 is prohibited from access Bus 36. An external device may access system integration unit 16 via Bus 28. Furthermore, the external device may access timer circuit 14, serial circuit 18, A/D converter 20, and SRAM 22 via bus 28, system integration unit 16, and Bus 36. Additionally, internal test circuits (not illustrated herein) are enabled and Bus 28 may be used to provide test information to test the internal circuits of data processing system 10. If the plurality of mode strobe integrated circuit terminals 77 is in a third logic state, data processing system 10 is operate in a master test mode. In master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. Additionally, internal test circuits of data processing system 10 are enabled. If the plurality of mode strobe integrated circuit terminals 77 is in a fourth logic state, data processing system 10 is configured to operate in a multiplexed master mode. In multiplexed master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. If the plurality of mode strobe integrated circuit terminals 77 is in a fifth logic state, data processing system 10 is configured to operate in a non-multiplexed mode. In non-multiplexed master test mode, CPU 12 executes instructions provided by an external device via Bus 36, system integration unit 16, and Bus 28. Internal address bus 52 is coupled to external address bus 66 and internal data bus 54 is coupled to external data bus 64. External address bus 66 and external data bus 64 are transferred via integration circuit terminals (not illustrated herein) to Bus 28. If the plurality of mode strobe integrated circuit terminals 77 is in a sixth logic state, data processing system 10 is configured to operate in a single chip mode. In the single chip mode, CPU 12 executes an instruction from an internal storage location such as SRAM 22 via Bus 36. External address bus 66, external data bus 64, and a portion of external control bus 62 are used for alternate functions such as digital input/output ports. External address bus 66, external data bus 64, and external control bus 62 are transferred via a plurality of integrated circuit terminals (not illustrated herein) to Bus 28. An external device provides the configuration data to the plurality of mode strobe integrated circuit terminals 77 via external Bus 28 when Reset integrated circuit terminal 70 is asserted and the Mode Select integrated circuit terminal 78 is in a second logic state. The configuration data is transferred via the Data Strobe, Size, and R/$\overline{\text{W}}$ signals to External Control bus 62.

The Mode Select signal provided by Mode Select integrated circuit terminal 78 is typically used to indicate a status of data processing system 10 to an external device. However, during a reset operation, the Mode Select integrated circuit terminal 78 is used to select whether the configuration data is taken from internal mask register 40 or from a plurality of integrated circuit pins. Generally, Mode Select integrated circuit terminal 78 is set to a logic state by an external device. If a user wants to configure data processing system 10 from configuration data stored in internal mask register 40, the user should either set Mode Select integrated circuit terminal 78 to a first logic state or allow data processing system 10 to rely on a default configuration. When data processing system 10 relies on the default configuration, Mode Select integrated circuit terminal 78 is set internally to the first logic state. As previously mentioned, none of the external integrated circuit pins, except Reset integrated circuit pin 70, should be driven by the external device during a reset operation in order to retrieve the configuration data from internal mask register 40. For users who do not provide the external device to determine a configuration of data processing system 10 during a reset operation, this alternative method for determining a configuration of data processing system 10 decreases overhead costs and increases the operating efficiency of the system. Likewise, if the user wants to configure data processing system 10 using configuration data provided by external Bus 28 via the plurality of integrated circuit bus terminals 48, the user should set Mode Select integrated circuit terminal 78 to a second logic state and set all other external integrated circuit pins used for configuring data processing system 10 during a reset operation to desired state. The implementation of the alternate embodiments allows the user greater flexibility to establish any desired reset configuration during reset.

During operation of data processing system 10, Reset integrated circuit terminal 70 indicates whether a reset operation is being currently executed. When Reset integrated circuit terminal 70 is asserted, a reset operation is being executed. Reset integrated circuit terminal 70 may be asserted externally by an external device during a reset operation or internally by reset circuit 46. Reset circuit asserts Reset integrated circuit terminal 70 during an internal reset operation.

During operation of data processing system 10, data configuration information is provided by either the plurality of bus terminals 48 or mask register 40 to external bus control circuit 44. External bus control circuit 44 is illustrated in greater detail in FIG. 4. In external bus control circuit 44, multiplexer 84 is used to select the configuration data transferred by the Mode Configuration signal during a reset operation. When the Reset signal is provided by reset circuit 46 to AND gate 86 is asserted and the Mode Select signal is in a first logic state, AND gate 86 provides an asserted output to multiplexer 84. Additionally, the output of AND gate 90 is negated. When the Reset signal is asserted and the Mode Select signal is in a second logic state, the output of inverter 88 and the output of AND gate 90 are asserted. Furthermore, the output of AND gate 86 is negated.

When the output of AND gate 86 is asserted, multiplexer 84 transfers a value communicated by the Mask Data signal to the Mode Configuration signal. Therefore, data processing system 10 uses configuration data taken from the contents of internal mask register 40. When the output of AND gate 90 is asserted, multiplexer 84 transfers the value from the plurality of bus terminals 48 using External Address bus 66 and External Control bus 62 (including the Size R/$\overline{W}$, and Data Strobe signals). This value is subsequently transferred via the Mode Configuration signal. As result, data processing system 10 uses configuration data taken from the plurality of bus terminals 48.

During a normal mode of operation, control circuit 80 receives the Configuration Data signals, together with other control and timing signals (not illustrated herein). Upon receipt of the data, control circuit 80 provides the Communication Control signals to Address/Data/Control Circuit 82. Address/Data/Control Circuit 82 uses information transferred via the Communication Control signal, Internal Control bus 56, and External Control bus 62 to communicate address, data, and control information between Internal Address bus 52, Internal Data bus 54, Internal Control bus 56, External Address bus 66, External Data bus 64, and External Control bus 62.

FIG. 5 illustrates a portion of the contents of the plurality of configuration registers 50 in the present embodiment of the invention. The contents of the plurality of configuration registers 50 are written during a reset operation to provide data processing system 10 with essential configuration information. When the Reset signal is asserted, the data transferred via the Mode Configuration signal is written into the plurality of configuration registers 50. Thereafter, the contents of the plurality of configuration registers 50 are provided to a remaining portion of data processing system 10 via the Configuration Data signal.

Referring to FIG. 5, the plurality of configuration registers 50 includes several fields which will be discussed in more detail below. It should be understood that alternate embodiments of the present invention are not limited by the fields illustrated herein.

During operation of data processing system 10, a mode field of the plurality of configuration registers 50 selects a mode of operation of data processing system 10. For example, if the plurality of mode strobe integrated circuit terminals 77 is in a first logic state, data processing system 10 is configured to operate in a peripheral mode. In peripheral mode, CPU 12 is disabled from accessing Bus 36. An external device may access system integration unit 16 via Bus 28. Furthermore, the external device may access timer circuit 14, serial circuit 18, A/ D converter 20, and SRAM 22 via bus 28, system integration unit 16, and Bus 36. If the plurality of mode strobe integrated circuit terminals 77 is in a second logic state, data processing system I 0 is configured to operate in a slave factory test mode. In slave factory test mode, CPU 12 is prohibited from access Bus 36. An external device may access system integration unit 16 via Bus 28. Furthermore, the external device may access timer circuit 14, serial circuit 18, A/D converter 20, and SRAM 22 via bus 28, system integration unit 16, and Bus 36. Additionally, internal test circuits (not illustrated herein) are enabled and Bus 28 may be used to provide test information to test the internal circuits of data processing system 10. If the plurality of mode strobe integrated circuit terminals 77 is in a third logic state, data processing system 10 is operate in a master test mode. In master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. Additionally, internal test circuits of data processing system 10 are enabled. If the plurality of mode strobe integrated circuit terminals 77 is in a fourth logic state, data processing system 10 is configured to operate in a multiplexed master mode. In multiplexed master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. If the plurality of mode strobe integrated circuit terminals 77 is in a fifth logic state, data processing system 10 is configured to operate in a non-multiplexed mode. In non-multiplexed master test mode, CPU 12 executes instructions provided by an external device via Bus 36, system integration unit 16, and Bus 28. Internal address bus 52 is coupled to external address bus 66 and internal data bus 54 is coupled to external data bus 64. External address bus 66 and external data bus 64 are transferred via integration circuit terminals (not illustrated herein) to Bus 28. If the plurality of mode strobe integrated circuit terminals 77 is in a sixth logic state, data processing system 10 is configured to operate in a single chip mode. In the single chip mode, CPU 12 executes an instruction from an internal storage location such as SRAM 22 via Bus 36. External address bus 66, external data bus 64, and a portion of external control bus 62 are used for alternate functions such as digital input/output ports. External address bus 66, external data bus 64, and external control bus 62 are transferred via a plurality of integrated circuit terminals (not illustrated herein) to Bus 28.

Additionally, a Fast/Slow field of the plurality of configuration registers 50 selects a clock frequency option. If the Fast/Slow field of the plurality of configuration registers 50 is in a first logic state, a clock input (not shown) to data processing system 10 is in a fast reference mode. If the Fast/Slow field is in a second logic state, the clock input to data processing system 10 is in a slow reference mode.

A Clock field selects the function of an integrated circuit terminal (not shown) for determining a clock output/port data function. If the Clock field is in a first logic state, the clock output/port integrated circuit terminal executes a port function. If the Clock field is in a second logic state, the clock output/port integrated circuit terminal executes a clock function.

A ROM Enable field of the plurality of configuration registers 50 selects a device which provides a first instruction to data processing system 10 after a reset operation is completed. If the ROM Enable field is in a first logic state, an internal boot ROM provides data processing system 10 the first instruction after the reset operation is completed. If the ROM Enable field is in a second logic state, the internal boot ROM of data processing system 10 is disabled, and an external device provides the first instruction to data processing system 10 after the reset operation is complete.

FIG. 6 illustrates a possible implementation of mask register 40 of the portion of system integration circuit 17. The contents of mask register 40 are stored during a fabrication phase of the manufacturing process of data processing system 10. The contents of mask register 40 may be used to write configuration data to the plurality of configuration registers 50 during execution of a reset operation. When the Reset signal is asserted and the Mode Select signal is in a first logic state, the contents of mask register 40 are provided to configuration register 50 via the Mask Data signal. Thereafter, the data provided via the Mask Data signal is written into configuration register 50.

In the present embodiment of the invention, mask register 40 may include several of the following fields. It should be noted that the FIG. 6 illustrates one embodiment of the present invention and that alternate embodiments may have different fields. In the embodiment of the invention illustrated in FIG. 6, a Mode field may be used to select a mode of operation of data processing system 10. For example, if mode select integrated circuit terminal 78 is in a first logic state during a reset, a mode of operation of data processing system 10 is configured by a logic state of the Mode field. If the Mode field is in a first logic state, data processing system 10 is configured to operate in a peripheral mode. In peripheral mode, CPU 12 is disabled from accessing Bus 36. An external device may access system integration unit 16 via Bus 28. Furthermore, the external device may access timer circuit 14, serial circuit 18, A/D converter 20, and SRAM 22 via bus 28, system integration unit 16, and Bus 36. If the plurality of mode strobe integrated circuit terminals 77 is in a second logic state, data processing system 10 is configured to operate in a slave factory test mode. In slave factory test mode, CPU 12 is prohibited from access Bus 36. An external device may access system integration unit 16 via Bus 28. Furthermore, the external device may access timer circuit 14, serial circuit 18, A/D converter 20, and SRAM 22 via bus 28, system integration unit 16, and Bus 36. Additionally, internal test circuits (not illustrated herein) are enabled and Bus 28 may be used to provide test information to test the internal circuits of data processing system 10. If the plurality of mode strobe integrated circuit terminals 77 is in a third logic state, data processing system 10 is operate in a master test mode. In master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. Additionally, internal test circuits of data processing system 10 are enabled. If the plurality of mode strobe integrated circuit terminals 77 is in a fourth logic state, data processing system 10 is configured to operate in a multiplexed master mode. In multiplexed master test mode, CPU 12 executes instructions provided by an external device via Bus 36, system integration unit 16, and Bus 28. Both internal address bus 52 and internal data bus 54 are multiplexed on external address bus 66. External address bus 66 is transferred via integration circuit terminals (not illustrated herein) to Bus 28. If the plurality of mode strobe integrated circuit terminals 77 is in a fifth logic state, data processing system 10 is configured to operate in a non-multiplexed mode. In non-multiplexed master test mode, CPU 12 executes instructions provided by an external device via Bus 36, system integration unit 16, and Bus 28. Internal address bus 52 is coupled to external address bus 66 and internal data bus 54 is coupled to external data bus 64. External address bus 66 and external data bus 64 are transferred via integration circuit terminals (not illustrated herein) to Bus 28. If the plurality of mode strobe integrated circuit terminals 77 is in a sixth logic state, data processing system 10 is configured to operate in a single chip mode. In the single chip mode, CPU 12 executes an instruction from an internal storage location such as SRAM 22 via Bus 36. External address bus 66, external data bus 64, and a portion of external control bus 62 are used for alternate functions such as digital input/output ports. External address bus 66, external data bus 64, and external control bus 62 are transferred via a plurality of integrated circuit terminals (not illustrated herein) to Bus 28.

A Fast/Slow field of mask register 40 may be used to select a clock frequency option of data processing system 10. If mode select integrated circuit terminal 78 is in first logic state during a reset operation, a clock reference circuit (not illustrated herein) is configured by a logic state of Fast/Slow field. If the Fast/Slow field is in first logic state, the clock input (not shown) to data processing system 10 is in a fast reference mode. If the Fast/Slow field is in a second logic state, the clock input to data processing system 10 is in a slow reference mode.

The Clock field may select a function of the clock output/port data integrated circuit terminal. If the mode select integrated circuit terminal 78 is in a first logic state during a reset operation, an external device which provides data to the clock output/port data integrated circuit terminal is configured by a logic state of the clock field. If the Clock field is in a first logic state, the clock output/port data integrated circuit terminal executes a port function. If the clock field is in a second logic state, the clock output/port data integrated circuit terminal executes a clock output function.

The ROM Enable field may be used to select a device which provides data processing system 10 with a first instruction after a reset signal is executed. If the mode select integrated circuit terminal 78 is in a first logic state during the reset operation, data processing system 10 is configured by a state of the ROM Enable field. If the ROM Enable field is in a first logic state, an internal boot ROM provides data processing system 10 with the first instruction after the reset operation is executed. If the ROM Enable field is in a second logic state, the internal boot ROM of data processing system 10 is disabled and an external device provides data processing system 10 with the first instruction after the reset operation is executed.

FIG. 7 illustrates the relationship between fields in configuration register 50 and mask register 40 in tabular form. The contents of configuration register 50 are written during a reset operation and provide data processing system 10 with essential configuration information. When the Reset signal is asserted a data value transferred via the Mode Configuration signal is written into the plurality of configuration registers 50. Thereafter, the contents of the plurality of configuration register 50 are transferred to bus interface unit 42 and external bus control 44 via the Configuration Data signal. Bus interface unit 42 transfers the configuration data to a remaining portion of data processing system 10 via Bus 36. If mode select integrated circuit terminal 78 is in a first logic state, the configuration data is provided from mask register 40. The configuration data is transferred to external bus control 44 via the Mask Data signal. External bus control 44 then transfers data provided by the Mask Data signal to the plurality of configuration registers 50 via the Mode Configuration signal.

If the mode select integrated circuit terminal 78 is in a second logic state, configuration data is provided from the plurality of bus terminals 48. An external device should provide configuration data to the plurality of bus terminals 48 via external Buss 28 when Reset integrated circuit terminal 70 is asserted. The configuration data is then transferred to external bus control 44 vis External Address Bus 66, External Data bus 64, and External Control bits 62. External bus control 44 transfers the configuration data received from the plurality of bus terminals 48 to the plurality of configuration registers 50 via the Mode Configuration signals. Contents of mask register 40 and the plurality of configuration registers 50 have been previously discussed. FIG. 7 tabulates the results of storing data values in the plurality of configuration registers 50 to indicate whether configuration data is provided by the plurality of bus terminals 48 or from mask register 40.

Figure 8:
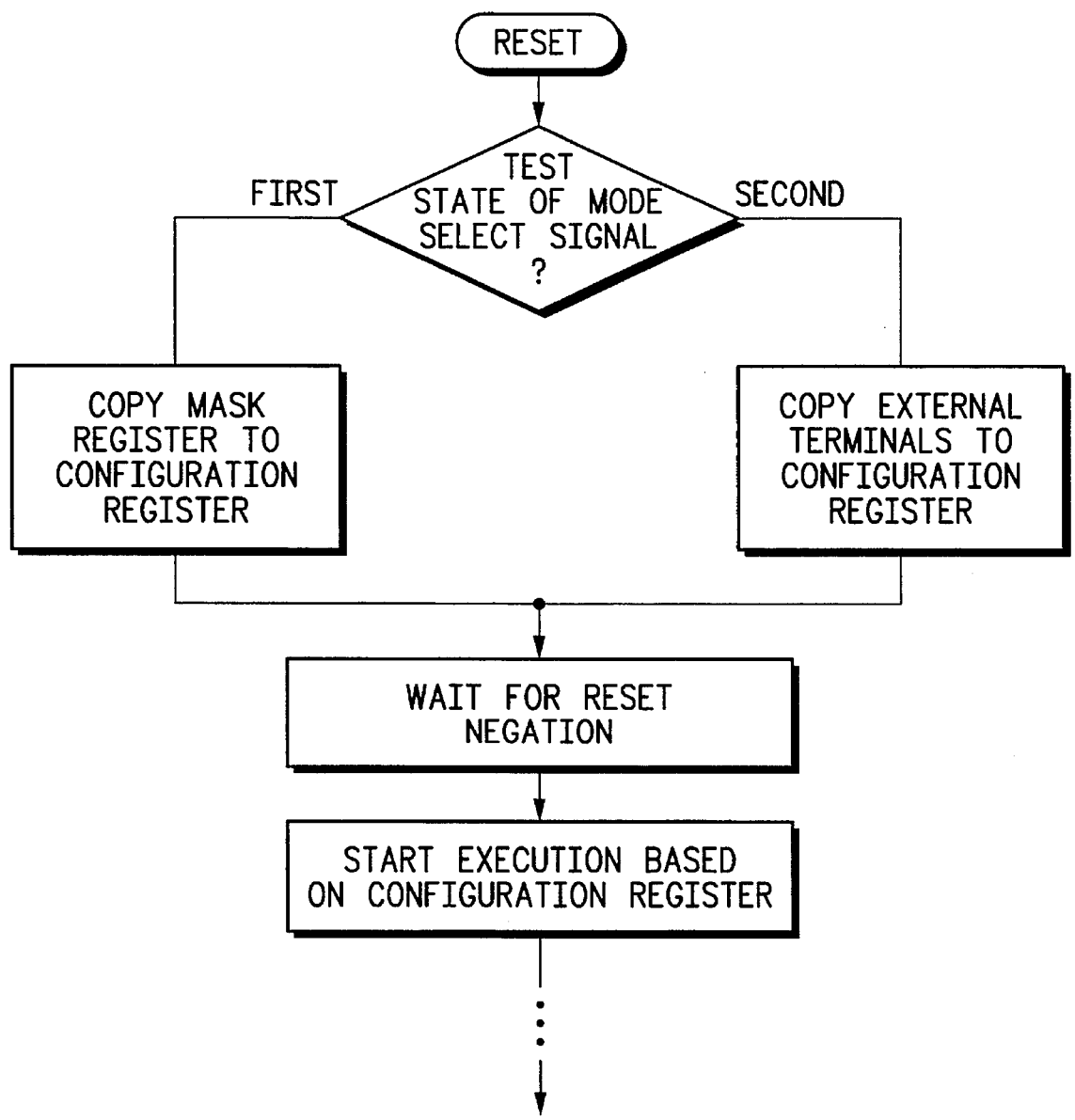
FIG. 8 provides in flow chart form a series of steps executed by the data processing system of FIG. I in accordance with the present invention.

FIG. 8 illustrate in a flow chart form the steps performed by data processing system 10 to configure internal circuitry for configuration during execution of a reset operation. In summarization, when the Reset signal is asserted, a state of the Mode Select signal is tested by external bus control 44. If mode select integrated circuit terminal 78 is in a first logic state, the configuration data is provided from mask register 40. The configuration data is transferred to external bus unit 44 via the Mask Data signal. External bus control 44 transfers the data transferred via the Mask Data signal to the plurality of configuration registers 50 via the Mode Configuration signal. The Mode Configuration signal is latched in the plurality of configuration registers 50. Subsequently, the configuration data transferred from the plurality of configuration registers 50 to bus interface unit 42 and external bus interface 44 via the Configuration Data signal. Bus interface unit 42 then transfers the configuration data to a remaining portion of data processing system 10 via Bus 36.

If mode select integrated circuit terminal 78 is in a second logic state, configuration data is provided from the plurality of bus terminals 48. An external device provides the configuration data to the plurality of bus terminals 48 via external Bus 28 when Reset integrated circuit terminal 70 is asserted. The configuration data is later transferred to external bus control 44 via External Address bus 66, External Data bus 64, and External Control bus 62. External bus interface 44 transfers the configuration data received from the plurality of bus terminals 48 to the plurality of configuration registers 50 via the Mode Configuration signal. Data transferred via the Mode Configuration signal is latched in the plurality of configuration registers 50. The contents of the plurality of configuration registers 50 are transferred to bus interface unit 42 and external bus control 44 via the Configuration Data signal. Bus interface unit 42 transfers the configuration data to a remaining portion of data processing system 10 via Bus 36. If mode select integrated circuit terminal 78 is in a first logic state, the configuration data is provided from mask register 40. The configuration data is transferred to external bus control 44 via the Mask Data signal. Subsequently, external bus control 44 transfers the Mask Data signal to the plurality of configuration registers 50 via the Mode Configuration signal. Configuration data is latched in the plurality of configuration registers 50 and is transferred to bus interface unit 42 and external bus control 44 via the Configuration Data signal. Bus interface unit 42 transfers the configuration data to a remaining portion of data processing system 10 via Bus 36.

If mode select integrated circuit terminal 78 is in a second logic state, configuration data is provided from the plurality of bus terminals 48. As previously mentioned, an external device provides the configuration data to the plurality of bus terminals 48 via external Bus 28 when Reset integrated circuit terminal 70 is asserted. Configuration data is then transferred to external bus control 44 via External Address bus 66, External Data bus 64, and External Control bus 62. External bus control 44 transfers the configuration data received from the plurality of bus terminals 48 to the plurality of configuration registers 50 via the Mode Configuration signal. The data transferred via the Mode Configuration signal is latched in the plurality of configuration registers 50. Subsequently, the data is transferred to bus interface unit 42 and external bus control 44 via the Configuration Data signal. Bus interface unit 42 transfers the configuration data to a remaining portion of data processing system 10 via Bus 36.

When the Reset signal is negated, data processing system 10 begins execution of data processing instruction or begins other activities which are executed in response to configuration data stored in the plurality of configuration registers 50.

In summary, a reset operation may be generated either internally or externally. An externally generated reset operation begins when an external device asserts reset integrated circuit terminal 70 of the plurality of bus terminals 48. In response to assertion of reset integrated circuit terminal 70, the Reset signal is asserted by reset circuit 46. An internally generated reset operation may be generated by any module of data processing system 10. In response to an internal reset request, the Reset signal and the External Reset signal are asserted. When both externally generated reset and internally generated reset operations are executed, the Internal Reset Request signal, the External Reset signal, and reset integrated circuit terminal 70 are asserted.

During a normal mode of operation, the Reset signal is not asserted. External bus control 44 receives the Configuration Data signal and communicates address, data, and control information between Internal Address bus 52, Internal Data bus 54, Internal Control bus 56, External Address bus 66, External Data 64, and External Control 62. External bus control 44 may receive additional control and timing signals (not illustrated herein). Bus interface unit 42 receives the Configuration Data signal, Internal Control bus 56, and External Control bus 62 to communicate address, data, and control information between Internal Address bus 52, Internal Data bus 54, Internal Control bus 56, External Address bus 66, External Data bus 64, and External Control bus 62.

During a reset operation, reset integrated circuit terminal 70 is asserted and data processing system 10 is configured for a desired mode of operation. A single integrated circuit pin is used to select whether data determining a configuration of data processing system 10 is provided internally from mask register 40 or externally via the plurality of bus terminals 48. If the mode select integrated circuit terminal 78 is in a first logic state, the configuration data is provided by mask register 40. The configuration data is transferred to external bus control 44 via the Mask Data signal. External bus control 44 transfers the Mask Data signal to the plurality of configuration registers 50 via the Mode Configuration signals. The mode configuration data is latched in the plurality of configuration registers 50. Subsequently, the mode configuration data is transferred to bus interface unit 42 and external bus control 44 via the Configuration Data signal. Bus interface unit 42 transfers the configuration data to a remaining portion of data processing system 10 via Bus 36.

If mode select integrated circuit terminal 78 is in a second logic state, configuration data is provided by the plurality of bus terminals 48. An external device provides the configuration data to the plurality of bus terminals 48 via external Bus 28 when reset integrated circuit terminal 70 is asserted. The configuration data is transferred to external bus control 44 via External Address bus 66, External Data bus 64, and External Control bus 62. External bus control 44 transfers the configuration data received from the plurality of bus terminals 48 to the plurality of configuration registers 50 via the Mode Configuration signal. The data transferred by the Mode Configuration signal is latched in the plurality of configuration registers 50. The contents of the plurality of configuration registers 50 are later transferred to bus interface unit 42 and external bus control 44 via the Configuration Data signal. Bus interface unit 42 transfers the configuration data to a remaining portion of data processing system 10 via Bus 36.

As previously mentioned, a single external pin, mode select integrated circuit terminal 78, selects when the configuration data is taken from an internal mask register or from external integrated circuit pins. Generally, mode select integrated circuit terminal 78 is set to a logic state by an external device. If a user wants to configure data processing system 10 from the internal mask register, the user should either set mode select integrated circuit terminal 78 to the first logic state or allow terminal 78 to be set according to a default value. If not driven by an external device, mode select integrated circuit terminal 78 is set internally to the first logic state. In other words, none of the external integrated circuit pins, except for reset integrated circuit terminal 70, must be driven by the external device during a reset operation to set the configuration data provided to the internal mask register.

If the user wants to configure data processing system 10 from data provided by external Bus 28 via the plurality of bus terminals 48, the user should set mode select integrated circuit terminal 78 to the second logic state and set all other external integrated circuit pins used during the reset operation to a desired state. Therefore, the user has the flexibility to set any desired reset configuration during the reset operation. The contents of mask register 40 are stored during a fabrication phase of the manufacturing process of data processing system 10.

When receiving the mode configuration data via the configuration data signals during the reset operation, bus interface unit 42 and external bus control 44 are configured to a desired configuration. Likewise, other modules of data processing system 10 are configured during the reset operation to the desired configuration via data transferred via Bus 36.

In conclusion, the present invention provides an internal mask programmable register which determines a default configuration of a data processor during a reset operation. During a reset operation, a configuration of the data processor would be determined because a first operation after reset may enable the data processor to function differently in different configurations. In the present invention, a default reset configuration of a data processor is taken from the programmable mask register unless the default reset configuration is overridden. The default reset configuration includes information for controlling an external bus configuration, a clock configuration, a chip select configuration, and a port configuration.

A customer which uses the data processor specifies the values to be programmed into the mask register during the fabrication process of the data processor. Optionally, the default reset configuration may be driven from external integrated circuit pins for applications such as production testing, development systems, prototypes, and for users who purchase data processors which may not have the required default reset configuration for their application. A single integrated circuit pin is used to select whether data is taken from a plurality of external integrated circuit pins or from the internal mask register. When the single integrated circuit pin is in a first logic state, a configuration data value used to configure the data processor is determined by the contents of the mask register. When the single integrated circuit pin is in a second logic state, the configuration data value is taken from the plurality of external integrated circuit pins.

The combined use of the mask programmable register and the ability to override a default configuration determined by the mask programmable register makes the present invention more cost effective than prior art implementations. For example, high volume users may eliminate external circuitry required to drive configuration data during execution of a reset operation and, therefore, reduce the cost of their data processing systems. Furthermore, the mask programmable register may be implemented by the manufacturer of the processor using known technology such that the data processor may be tailored to the specifications of such high volume users. Furthermore, the user may easily configure the data processor using the internal mask register by either placing a mode select terminal in a first logic state. If configuration data is not driven onto the external integrated circuit pins of the data processor by an external device, the mode select terminal is set to the first logic state by circuitry internal to the data processor. Stated another way, none of the external integrated circuit pins, except for a reset integrated circuit pin, must be driven by an external device during reset to set the configuration data from the internal mask registers. Such a feature is very useful for users who want to avoid the overhead costs of providing an external device to provide the reset configuration data to the external integrated circuit pins during a reset operation.

The present invention also allows the data processor to be selectively configured to the default configuration and any other configuration which may be required for testing purposes or any other operation which requires the default configuration to be overridden. The selectivity embodied by the data processor implementing the present invention is especially useful for low volume users who can not afford the expense of having a manufacturer design a data processor tailored to their specifications. Additionally, the ability of the present invention to selectively configure the data processor is useful for those users who want to use existing data processors as prototypes or for system development.

The implementation of the invention described herein is provided by way of example only. However, many other implementations may exist for executing the function described herein. For example, in an alternate embodiment of the invention, data provided by mask register 40 may only be provided during a reset operation or the data may be driven permanently on the Mask Data signal. Additionally, multiplexer 84 may be designed such that it selects data provided by externally via the plurality of bus terminals 48 or internally via mask register 40 and drives that data onto the Mode Configuration signal as a function only of the Mode Select signal. The Reset signal may not used for the function of the multiplexing. As well, AND gate 86, inverter 88, and AND gate 90 may be replaced by alternate logic components which perform a similar function. As well, Clock or other timing signal may provide timing information to multiplexer 84, configuration register 50, or to AND gate 86, inverter 88, and AND gate 90, to perform a data multiplexing and a write operation to the plurality of configuration registers 50 using a specified, predetermined timing. Furthermore, instead of waiting for a Reset signal to be negated, a program flow control may repeat a reset operation until the Reset signal is negated. In that case the value latched in the plurality of configuration registers 50 is a last value latched before the Reset signal was negated. Additionally, in an alternate embodiment, a same signal may be used for internal reset and external reset. Furthermore, in an alternate embodiment, the data processor checks to determine if the reset value is negated before beginning execution. If reset is negated, execution based on the contents of the configuration register is initiated. If reset is asserted, a programming flow returns to test a state of the mode select signals.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A data processing system, comprising:
   a bus interface unit for receiving a plurality of internal address values, a plurality of internal data values, and a plurality of internal control values;
   a mask register for storing a first configuration data value;
   a plurality of bus terminals, a first portion of the plurality of bus terminals receiving a second configuration data value and a second portion of the plurality of bus terminals receiving a mode select data value;
   a reset circuit for providing an internal reset signal to indicate the data processing system is executing a reset operation;
   an external bus control circuit coupled to the reset circuit for receiving the internal reset signal, coupled to the plurality of bus terminals for receiving the second configuration data value and the mode select data value, and coupled to the mask register for receiving the first configuration data value, the external bus control circuit providing the first configuration data value when the mode select data value is in a first logic state and the external bus control circuit providing the second configuration data value when the mode select data value is in a second logic state; and
   a configuration register coupled to the reset circuit for receiving the internal reset signal and coupled to the external bus control circuit for storing a one of the first configuration data value and the second configuration data value when the internal reset signal is asserted.

2. The data processing system of claim 1 wherein:
   the bus interface unit is coupled to the configuration register for receiving the configuration data signal when the internal reset signal is asserted and the bus interface unit is configured in response to the configuration data signal to communicate a data value in a preselected format.

3. The data processing system of claim 1 wherein the configuration register provides the one of the first configuration data value and the second configuration data value via a configuration data signal after the internal reset signal is negated.

4. The data processing system of claim 1 wherein the mask register is a mask programmable read only memory.

5. The data processing system of claim 1 wherein the configuration data signal enables the data processing system to operate in a preselected mode of operation.

6. The data processing system of claim 5 wherein the preselected mode of operation is one of a peripheral mode, a slave test mode, a master test mode, a multiplexed master mode, a non-multiplexed mode, and a single chip mode.

7. The data processing system of claim 1 wherein the configuration data signal selects a function to be executed by a preselected one of the plurality of bus terminals.

8. The data processing system of claim 7 wherein the function is one of a clock output function and a port function.

9. The data processing system of claim 1 wherein the configuration data signal selects a source of a first instruction provided to the data processing system after the internal reset signal is negated.

* * * * *